(12) United States Patent
Iwaki

(10) Patent No.: US 6,559,923 B2
(45) Date of Patent: *May 6, 2003

(54) IMAGE REPRODUCING APPARATUS WHICH PERFORMS THE SAME PROCESSING ON IMAGE DATA TO BE DISPLAYED AS IMAGE DATA TO BE PRINTED

(75) Inventor: Yasuharu Iwaki, Kanagawa (JP)

(73) Assignee: Fuji Photo Film Co., Ltd., Kanagawa (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/236,614

(22) Filed: Jan. 26, 1999

(65) Prior Publication Data
US 2001/0043315 A1 Nov. 22, 2001

(30) Foreign Application Priority Data
Jan. 26, 1998 (JP) ............................................. 10-012495

(51) Int. Cl.$^7$ ......................... G03B 27/52; G03B 27/72; G03B 27/74; H04N 1/21; H04N 1/387
(52) U.S. Cl. .............................. 355/40; 355/71; 355/68; 358/296; 358/450
(58) Field of Search ............................. 355/38, 68, 71, 355/40, 45, 56; 358/483, 296, 302, 450; 348/333.11

(56) References Cited

U.S. PATENT DOCUMENTS

| | | | | |
|---|---|---|---|---|
| 5,140,445 A | * | 8/1992 | Takashima et al. | 358/483 |
| 5,828,461 A | * | 10/1998 | Kubo et al. | 358/296 |
| 5,986,741 A | * | 11/1999 | Kimura | 355/38 |
| 5,995,201 A | * | 11/1999 | Sakaguchi | 355/55 |
| 6,226,070 B1 | * | 5/2001 | Yamamoto | 355/40 |
| 2001/0000126 A1 | * | 4/2001 | Kinjo | 358/450 |

* cited by examiner

Primary Examiner—Alan A. Mathews
Assistant Examiner—Peter B. Kim
(74) Attorney, Agent, or Firm—Birch, Stewart, Kolasch & Birch, LLP

(57) ABSTRACT

An image reproducing apparatus to reproduce input image data supplied from an image data supply source as a visible image, which comprises a display, a printer, and an image processing device which shares hardware for processing the input image data to obtain image data to be represented on the display and image data for image recording with the printer. The image processing device includes an image processing section to subject the input image data to specified image processing steps and a data converting section to convert the thus processed data to the image data for displaying and the image data for image recording. The apparatus can reduce the distinction between the image to be represented on the display and the image to be reproduced on the hard copy, or the distinction found on the images reproduced in the image output devices due to the output properties thereof, with reduced cost of the image processing device.

7 Claims, 5 Drawing Sheets

IMAGE REPRODUCING APPARATUS WHICH PERFORMS THE SAME PROCESSING ON IMAGE DATA TO BE DISPLAYED AS IMAGE DATA TO BE PRINTED

BACKGROUND OF THE INVENTION

This invention relates to the technical field of an image reproducing apparatus in which image data obtained from an image data supply source such as a scanner used for photoelectric reading of an image on a film is subjected to image processing steps to reproduce the image on a display or hard copy, that is, to output the image to be reproduced to a plurality of image output devices.

Currently, the image recorded on a photographic film such as a negative film or a reversal film (which is hereinafter referred to as "film") is printed to a light-sensitive material (photographic paper) by "direct exposure" (or analog exposure), in which the image on a film is projected onto the light-sensitive material to perform areal exposure.

A printer that relies upon digital exposure has recently been commercialized. Called a "digital photoprinter", the apparatus operates in the following manner: the image recorded on a film is read photoelectrically; the image is then converted to a digital signal and subjected to various image processing steps to produce image data for recording; a light-sensitive material is exposed by scanning with recording light modulated in accordance with the image data, whereby an image (latent image) is recorded; the necessary processing is done to produce a (finished) print.

In the digital photoprinter, the image recorded on a film is converted to digital image data, which is then processed to determine the conditions for exposure to be performed in printing; hence, the correction of drop-outs or blocked-ups in image such as washed-out highlights or dull shadows due to photography with back light or an electronic flash, sharpening, or the correction of color or density failure can be effectively performed to produce prints of very high quality that have heretofore been unattainable by conventional direct exposure. What is more, by image data processing, a plurality of images can be assembled into one composite image or a single image can be divided into more than one image and even characters can be assembled; thus, prints can be outputted after editing/processing is done in accordance with a specific use.

With the digital photoprinter, the desired image can not only be outputted as a finished print (photo); the image data can also be supplied to a computer or stored in a recording medium such as a floppy disk; thus, the image data can be utilized in various applications other than photography.

Having these capabilities, the digital photoprinter basically comprises a scanner (image reading device) for photoelectric reading of the image recorded on a film, an image processing device that performs image processing on the thus read image to produce output image data (conditions for exposure), and a printer that performs scan exposure on a light-sensitive material in accordance with the image data from the image processing device to form a latent image and that subjects the exposed light-sensitive material to development and other necessary steps to produce a finished print.

In the scanner, reading light issuing from a light source is allowed to be incident on the film to produce projected light carrying the image recorded on the film and the projected light is focused through an imaging lens on an image sensor such as a CCD sensor, whereby photoelectric conversion is effected to read the image from the film; after optionally being subjected to various image processing steps, image data from the film (image data signal) is sent to the image processing device.

The image processing device sets the conditions for image processing on the basis of the image data that has been read with the scanner; the device then performs image processing on the image data in accordance with the thus set conditions and supplies the printer with output image data (exposure conditions) for image recording.

In the printer, if it is of a type that relies upon exposure by scanning with light beams, the latter are modulated in accordance with the image data sent from the image processing device and deflected in a main scanning direction; at the same time, a light-sensitive material is transported in an auxiliary scanning direction perpendicular to the main scanning direction to expose to the light beams carrying the image, thereby forming a latent image. The image is then subjected in the processor to development and other processing steps in accordance with the light-sensitive material, thereby producing a finished print (photograph) reproducing the image recorded on the film.

Not only the aforementioned digital photoprinter, but also image reproducing apparatuses to output image data delivered from an image data supply source as a finished print (or hard copy) perform verification of an image to be reproduced on the finished print. Therefore, these apparatuses are usually provided for example with a display such as a CRT (cathode ray tube) to represent the reproduced image of the image data supplied from the image data supply source such as a scanner. It is needless to say that, for appropriate image verification, the reproduced image to be represented on the display (display image) must be also subjected to the same image processing as in the image to be reproduced on the finished print (print image).

In order to satisfy the requirement, the image processing device has two independent hardware units: a hardware (H/W) for image processing of the image data to be represented on the display, and a hardware for image processing of the image data to be output as a hard copy with the printer. This arrangement increases equipment cost of the image processing device. What is more, there is a case where the image represented on the display is different from the image reproduced on the hard copy in spite of the same image processing performed.

SUMMARY OF THE INVENTION

The present invention has been accomplished under these circumstances and has as an object providing an image reproducing apparatus in which image data supplied from an image data supply source including a scanner, various recording media and imaging devices is subjected to specified image processing steps to represent on a display as a visible image and output with a printer as a hard copy, that is, to output to a plurality of image output devices and which can reduce the distinction between the image to be represented on the display and the image to be reproduced on the hard copy, or between the images to be reproduced in the image output devices, with reduced equipment cost of the image processing device.

In order to attain the above object, the present invention provides an image reproducing apparatus to reproduce input image data supplied from an image data supply source as a visible image, comprising:

a display to represent an image;

a printer to output a hard copy having the image recorded thereon; and an image processing device which shares hardware for processing the input image data to obtain image data to be represented on said display and image data for image recording with said printer and which includes:

an image processing section to subject the input image data supplied from said image data supply source to specified image processing steps to produce processed image data, and a data converting section to convert the processed image data output from said image processing section to the image data to be represented on said display and the image data for image recording with said printer.

Preferably, said image processing device subjects the input image data supplied from said image data supply source to the same image processing steps, except that different conversion parameters of the processed image data are used in said data converting section in representing the image on said display and in outputting the hard copy with said printer.

Preferably, said conversion parameters are elements of a 3D-LUT or a 3D-MTX to convert said processed image data.

Preferably, the image data to be represented on said display and the image data for image recording with said printer have different resolutions between the image to be represented on said display and the image to be reproduced on said hard copy, and said data converting section performs at least one conversion processing of thinning-out, electronic magnification and interpolation to convert said processed image data to obtain the resolutions suitable for each of the image data to be represented on said display and the image data for image recording with said printer.

Preferably, said conversion parameters are elements of a 3D-LUT or a 3D-MTX to perform said conversion processing.

Preferably, said specified image processing steps to be performed by said image processing section include at least one of color balance adjustment, gradation adjustment, density adjustment, dodging, saturation correction, sharpening, electronic magnification, soft focusing, sepia finishing, black-and-white finishing, high-contrast finishing, low-contrast finishing, posterized finishing, picture-like finishing, extraction of a principal portion (or subject) and red eye treatment.

According to the present invention, there is also provided an image reproducing apparatus to reproduce input image data supplied from an image data supply source as a visible image, comprising:

a plurality of output devices to output an image; and an image processing device which shares hardware for processing processed image data to obtain image data suitable for output properties of each of said plurality of output devices and which includes:

an image processing section to subject the input image data supplied from said image data supply source to specified image processing steps to produce the processed image data, and a data converting section to convert the processed image data output from said image processing section to the image data suitable for the output properties of each of said plurality of output devices.

DETAILED DESCRIPTION OF THE INVENTION

The image reproducing apparatus of the present invention is now described in detail with reference to the preferred embodiments shown in accompanying drawings.

Figure 1:
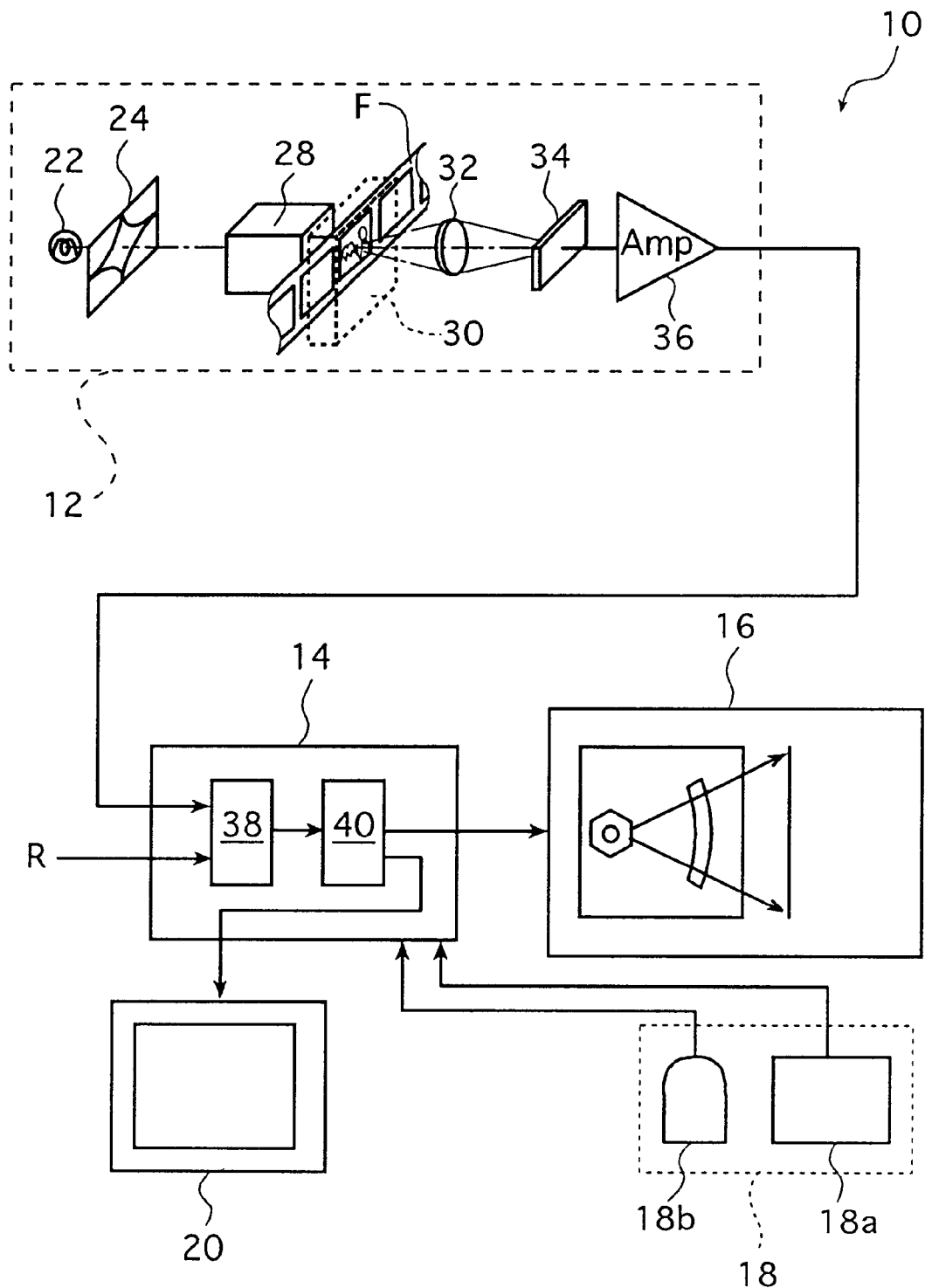
FIG. 1 is a block diagram showing a digital photoprinter using an embodiment of the image reproducing apparatus of the present invention.

FIG. 1 is a block diagram showing an exemplary digital photoprinter using the image reproducing apparatus of the present invention.

The digital photoprinter (hereinafter referred to as "photoprinter") which is generally indicated by 10 in FIG. 1 comprises basically a scanner (image reading device) 12 for photoelectric reading of the image recorded on a film F, an image processing device 14 which performs image data processing and with which the photoprinter 10 as a whole is manipulated and controlled, and a printer 16 which performs imagewise exposure of a light-sensitive material A with light beams modulated in accordance with the image data delivered from the image processing device 14 and which performs development and other necessary processing to produce a (finished) print.

Connected to the image processing device 14 are an image data supply source R other than the scanner 12, a manipulating unit 18 having a keyboard 18a and a mouse 18b for inputting (setting) various conditions, selecting and commanding a specific processing step and entering a command and so forth for effecting color/density correction, as well as a display 20 for displaying the image read with the scanner 12, various manipulative commands and pictures for setting and registering various conditions on its screen.

The image processing device 14, the printer 16 and the display 20 constitute the image reproducing apparatus of the invention.

The scanner 12 is an apparatus with which the image recorded on the film F is read photoelectrically frame by frame. It comprises a light source 22, a variable diaphragm 24, a diffuser box 28 which diffuses reading light incident on the film F so that it becomes uniform across the plane of the film F, an imaging lens unit 32, an image sensor 34 having line CCD sensors associated with image reading of the respective three primary colors R (red), G (green) and B (blue), and an amplifier (Amp) 36.

In the photoprinter 10, dedicated carriers 30 are available that can be loaded into the body of the scanner 12 in accordance with the type or the size of the film used (e.g. whether it is of an Advanced Photo System or a negative or a reversal of 135 size) or the format of the film (e.g. whether it is a strip or a slide). By replacing one carrier 30 with another, the photoprinter 10 can be adapted to process various kinds of films in various modes. The image (frame) that is recorded on the film and which is subjected to the necessary procedure for print production is transported to and held in a specified reading position by means of the carriers 30.

As is well known, a film of the Advanced Photo System has a magnetic recording medium formed thereon and information such as the ID number of the film cartridge and the types of the film is recorded. In addition, after taking a picture on the film, development of the film and so forth, various kinds of data such as the date of shooting, position information of the principal portion (principal subject) and the type of the developing machine used can be recorded on the film. A carrier 30 corresponding to the film (or its cartridge) of the Advanced Photo System is fitted with a means of reading said magnetic information from the magnetic recording medium. Said means reads the magnetic information as the film is being transported to the reading position, so that the various kinds of information mentioned above are sent to the image processing device 14.

In the scanner 12, the reading light from the light source 22 has its quantity adjusted by means of the variable diaphragm 24 and is incident on the film F held in the specified reading position by means of the carrier 30 and thereafter passes through the film to produce projected light carrying the image recorded on the film F.

Figure 2A:
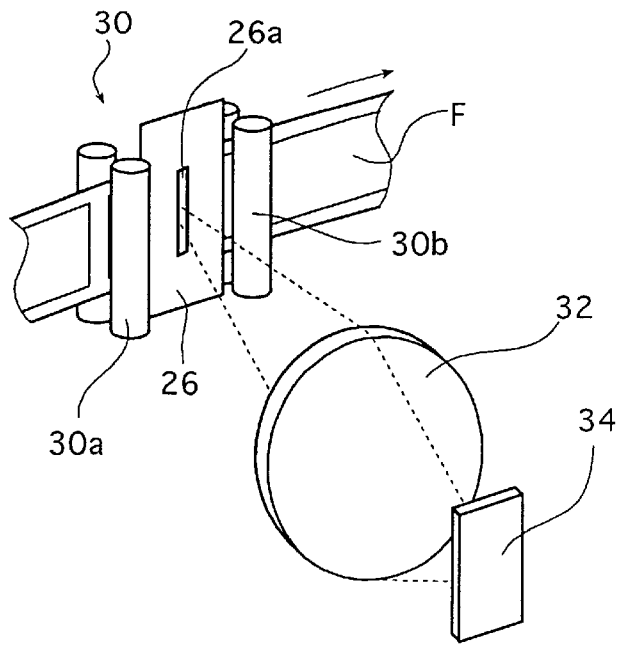
FIG. 2A is a schematic perspective view showing a carrier mounted on the digital photoprinter shown in FIG. 1.

The carrier 30 is intended for the elongated film F (strip) such as a 24-frame film of 135 size and a cartridge of the Advanced Photo System. As shown in FIG. 2A schematically, the carrier 30 comprises transport roller pairs 30a, 30b and a mask 26. The former are provided on the opposite sides of the reading position in an auxiliary scanning direction to transport the film F longitudinally or in the auxiliary scanning direction perpendicular to the direction (main scanning direction) in which the line CCD sensors in the image sensor 34 are arranged, while holding the film F in the specified reading position, and the latter has a slit 26a which extends in the main scanning direction in a position associated with the reading position to restrict the projected light from the film F to a specified slit form.

The reading light is incident on the film F which is transported in the auxiliary scanning direction while being held in the reading position by the carrier 30. Consequently, the slit 26a extending in the main scanning direction slit-scans the film F two-dimensionally to read the image recorded on each frame of the film F (the image on the original).

The projected light from the film F passes through the imaging lens unit 32 to be focused on the light-receiving plane of the image sensor 34.

Figure 2B:
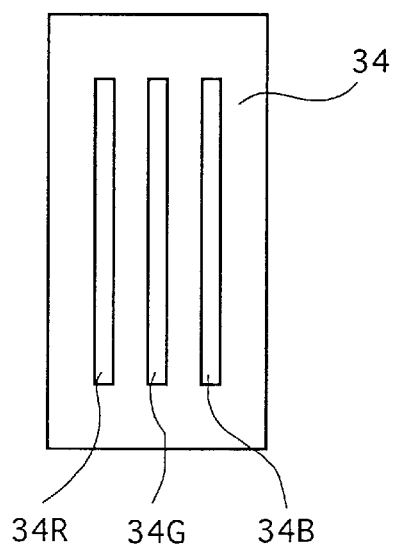
FIG. 2B shows in conceptual view an image sensor of the digital photoprinter shown in FIG. 1.

As shown in FIG. 2B, the image sensor 34 is the so called three-line color CCD sensor unit having a line CCD sensor 34R for reading of the R image, a line CCD sensor 34G for reading of the G image and a line CCD sensor 34B for reading of the B image. The respective line CCD sensors extend in the main scanning direction as described above. The image sensor 34 reads the projected light from the film F photoelectrically as three separate primary colors R, G and B.

Output signals from the image sensor 34 are amplified by the amplifier 36 and sent to the image processing device 14.

The scanner for supplying the image data of the film F into the image reproducing apparatus of the invention is not limited to the one depending on slit scanning, and areal exposure in which the whole surface of the image of one frame is read at a time may be used.

In this case, a means for inserting color filters R, G and B is provided between the light source and the film F. The respective colors filters R, G and B are successively inserted to separate the image recorded on the film into three primary colors, thereby reading the image by means of an area CCD sensor.

The source of supplying image data into the image reproducing apparatus of the invention is not limited to the aforementioned scanner 12, and an image reading device for reading the image on a reflection original, an imaging device such as a digital camera or a digital video camera, communication means such as a LAN (local area network) or an on-line service network, and a recording medium (including reading means thereof) such as a memory card or MO (magneto-optical recording medium) can be used.

Output signals (image data) from the scanner or another image data supply source R are delivered to the image processing device 14 (hereinafter referred to as the "processor"). The processor 14 comprises an image processing section 38 and a data converting section 40 and performs specified image processing steps on the image data. The processed image data is delivered to the display 20 or the printer 16 as the output image data.

It should be noted that the processor 14 performs not only processing of the image data, but also control and management of the photoprinter 10 as a whole including the processor 14. The processor 14 actually includes not only the illustrated parts, but also other necessary parts such as a CPU with which the photoprinter 10 as a whole is controlled and managed, and a memory for storing the information necessary for operation and otherwise of the photoprinter 10. The manipulating unit 18 and the display 20 are connected to related parts via the CPU and other necessary parts (forming a CPU bus).

The image data supplied from the scanner 12 or another image data supply source R is subjected to A/D (analog/digital) conversion, logarithmic conversion, DC offset correction, dark correction, shading correction and other specified data processing steps and delivered into the image processing section 38 where necessary image processing steps are performed. The processed image data is then converted in the data converting section 40 to at least one of the image data adapted for print production (image recording) with the printer 16 and the image data adapted for image representation on the display 20.

According to the image reproducing apparatus of the invention, the image data to be output to the printer 16 and the display 20 are both processed by the same hardware in the image processing section 38 and the data converting section 40. That is, the hardware is shared for image processing of the image to be represented and the image to be printed. The present invention can reduce distinction between the image represented on the display 20 and the image reproduced with the printer 16, with noticeably reduced equipment cost.

In the image processing section 38, the image data to be output to the printer 16 and the image data to be output to the display 20 may be processed at a different resolution (pixel density), for example using low resolution prescan image data and high resolution fine scan image data or by removing a portion of the image data (thinning-out of the image data) or processing otherwise.

In a preferred embodiment however, the same image data are subjected to the same processing steps in the image processing section 38 whether the image data is output to the printer 16 or the display 20 and are converted in the data converting section 40 with the conversion parameters corresponding to the printer 16 and the display 20, respectively, whereby the image reproduced on the print with the printer 16 and the image represented on the display 20 can have higher similarity.

The image processing steps to be performed in the processing section 38 are not limited in any particular way, and include any known steps performed in various image processing devices, specifically at least one of color balance adjustment (gray balance adjustment), gradation adjustment, density adjustment, dodging (compression/expansion of the density's dynamic range), saturation correction, sharpening, electronic magnification, soft focusing, sepia finishing, black-and-white finishing, high-contrast finishing, low-contrast finishing, posterized finishing, picture-like finishing, extraction of the principal portion (or subject) and red eye treatment. These steps may be performed by any known methods comprising suitable combinations of processing with a LUT (lookup table), filtering, matrix (MTX) operations, arithmetic operations for interpolation and processing with an adder or subtracter.

The image processing conditions for each image processing may be set (calculated) by any known method using density histograms and various image characteristic quantities such as highlight (minimum density), shadow (maximum density), average density and LATD (large-area transmission density).

When the operator manipulates various image adjustment keys on the keyboard 18a such as a gradation adjustment key, a color adjustment key and density adjustment key and the mouse 18b to give an image processing command, the image processing conditions are set in view of the command. When the operator entered a command for image adjustment after setting of the image processing conditions and the verification of the image, the image processing conditions are accordingly adjusted (or modified) as appropriate.

The data converting section 40, as required, removes a portion of the image data to thin out the image data and performs electronic magnification, arithmetic operations for interpolation or other processing. The image data processed by the image processing section 38 is converted to the image data for outputting with the printer 16 or the image data for image representation on the display 20. For example, the data converting section 40 performs resolution conversion so as to obtain a resolution (or pixel density) suitable for the image to be reproduced for each of the image data for print outputting and the image data for image displaying.

The method of converting the image data (or conversion parameters used) in the data converting section 40 is not limited in any particular way, and is exemplified by a method with a 3D (three-dimensional) LUT or a 3D-MTX. Corresponding conversion parameters are set in (the hardware of) the data converting section 40 depending on the destination of the image data (printer 16 or display 20). The conversion parameters used in the data converting section 40 are elements of the 3D-LUT and the 3D-MTX.

The image data processed in the data converting section 40 is output to the printer 16 and/or the display 20.

The display 20 used in the image reproducing apparatus of the invention is not limited to any particular type, and is exemplified by a CRT (cathode ray tube), a projection display, a discharge panel display and a liquid-crystal display. Further, the printer 16 of the invention is neither limited to any particular type, and the examples thereof include not only a photographic printer-processor to be described below, but also photographic printers of different recording system such as a photo-recording thermal processor and a thermal printer, an electrographic printer, a sublimate-type printer and an ink-jet printer.

Figure 3:
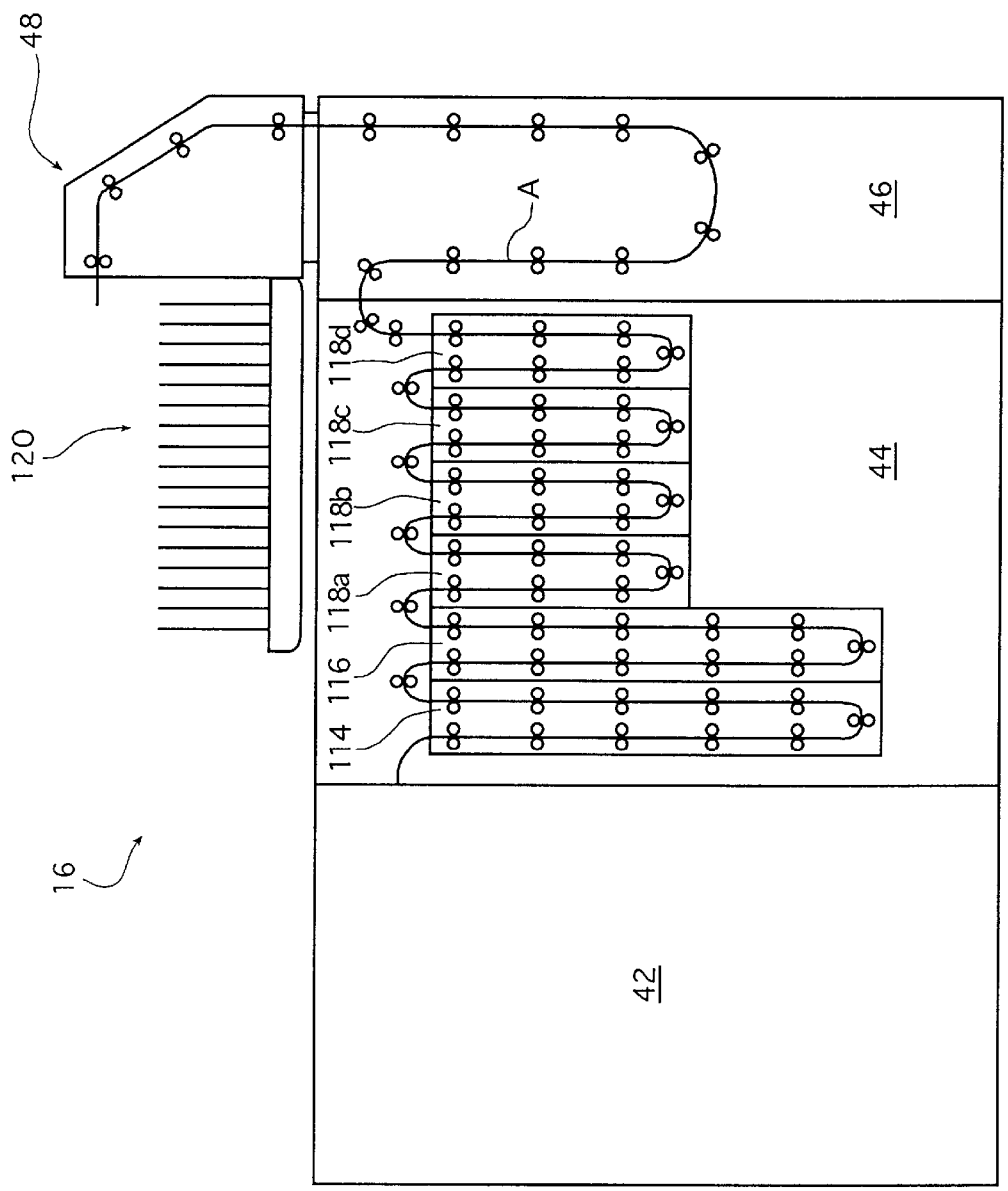
FIG. 3 shows in conceptual view a printer of the digital photoprinter shown in FIG. 1.

FIG. 3 shows a schematic view of the printer 16. The printer 16 is a printer-processor which performs imagewise exposure and specified development steps on the light-sensitive material A (photographic paper) to output as a print, and comprises an exposing section 42, a developing section 44, a drying section 46 and a delivering section 48.

Figure 4:
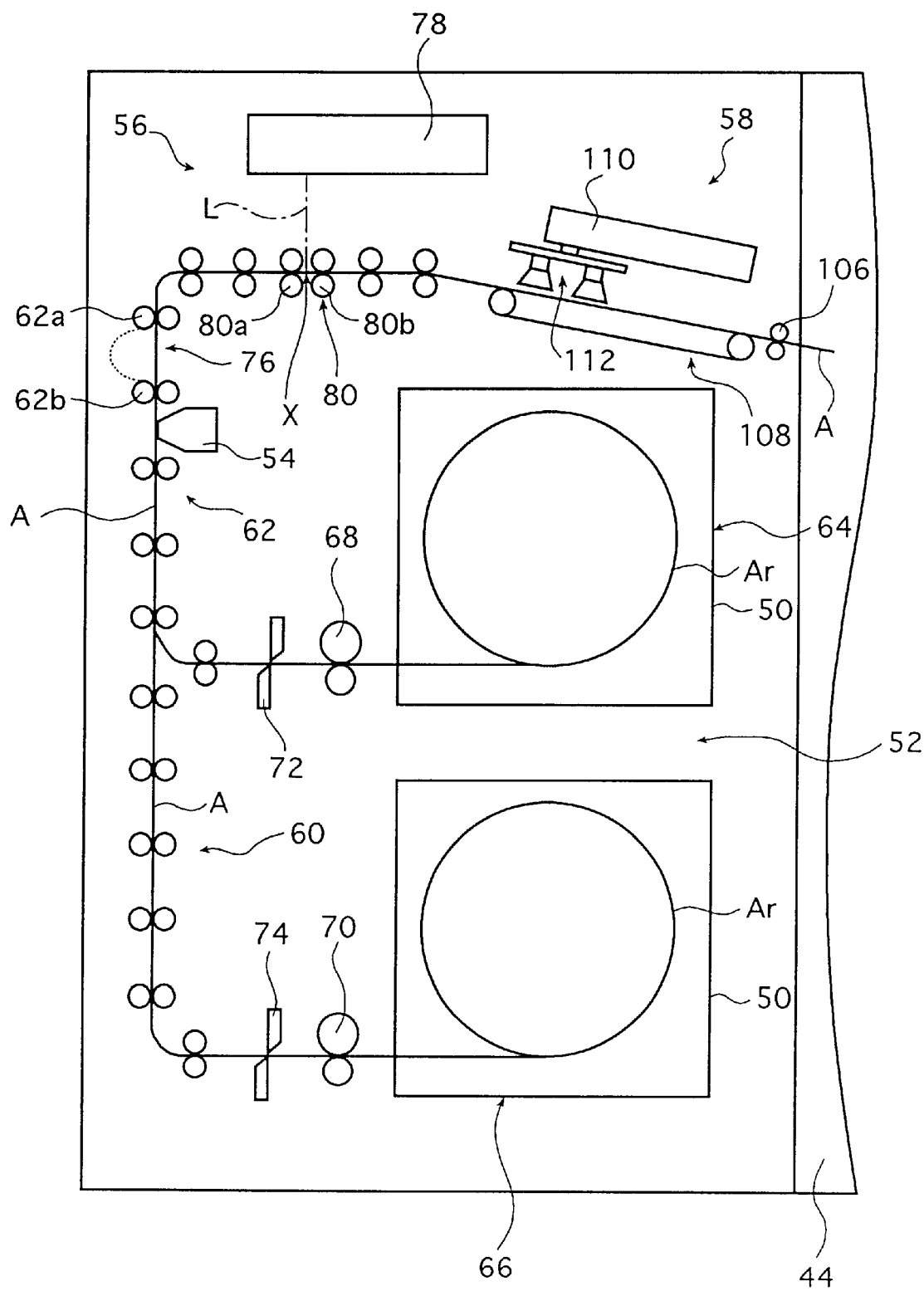
FIG. 4 is a schematic view of an exposing section of the printer shown in FIG. 3.

FIG. 4 shows a schematic view of the exposing section 42. The exposing section 42 is an apparatus in which a roll of the elongated light-sensitive material A is withdrawn from the magazine 50 and cut to individual sheets of a specified length associated with the prints to be finally produced and, after back printing (recording of a back print) and digital scan exposure, the exposed sheets of the light-sensitive material A are supplied to a developing section 44. Having these capabilities, the exposing section 42 comprises a light-sensitive material supply subsection 52, back printing means 54 for recording a back print, an image recording subsection 56, a distributing subsection 58 as well as a first transport subsection 60 and a second transport subsection 62 for transporting the cut sheets of the light-sensitive material A to the image recording subsection 56.

It should be noted that, in addition to the illustrated components, means of transporting the light-sensitive material A, transport guides, sensors and various other members are also incorporated, as required, in the exposing section 42.

Further referring to the exposing section 42, the light-sensitive material supply subsection 52 (hereinafter referred to as a "supply subsection 52") comprises loaders 64 and 66, withdrawing roller pairs 68 and 70, and cutters 72 and 74.

The loaders 64 and 66 are sites into which are loaded magazines 50 containing a roll Ar of the elongated light-sensitive material A within a light-proof case. The magazines 50 to be loaded into both the loaders 64 and 66 are usually adapted to contain different types of rolls Ar of the light-sensitive material A which is characterized by their size (width), surface gloss (silk-finish, matte and so forth), specifications (e.g. thickness and base type), and so forth.

The withdrawing roller pair 68 or 70 is operated to withdraw the light-sensitive material A from the magazine 50 loaded into the corresponding loader 64 or 66 and the withdrawn light-sensitive material is transported. The transport stops at the point of time when the light-sensitive material A has been transported downstream from the corresponding cutter 72 or 74 by a length corresponding to each of the prints to be produced (image to be recorded). Subsequently, the cutter 72 or 74 turns on to cut the light-sensitive material A to individual sheets of a specified length.

The light-sensitive material A taken out of the magazine 50 in the loader 66 and cut into individual sheets of a specified length by means of the cutter 74 is transported upward by means of the first transport subsection 60 and the second transport subsection 62, each consisting of a number of transport roller pairs. On the other hand, the light-sensitive material A taken out of the magazine 50 in the loader 64 and cut into individual sheets by means of the cutter 72 is transported upward by means of the second transport subsection 62. Subsequently, these sheets are both transported in the right direction to the image recording subsection 56 (particularly scan transport means 80) with the recording surface side facing upward.

The back printing means 54 is located in the middle of the second transport subsection 62.

The back printing means 54 is used to record on a non-record reverse surface of the light-sensitive material A (where no emulsion is coated) a back print consisting of various pieces of information such as the date when the picture was taken, the date of printing (exposure), frame number, film identification (ID) number. The light-sensitive material A is subjected to back print recording with the back printing means 54 as it is transported by means of the second transport subsection 62.

A loop forming area 76 is provided between the transport roller pairs 62a and 62b which are downstream of the back printing means 54 in the second transport subsection 62.

Thus, the transport speed of the light-sensitive material A in the second transport subsection 62 is set as follows: the speed in the transport roller pair 62a and subsequent components which are downstream of the loop forming area 76 is the same as the scanning transport speed in the image recording subsection 56 (scan transport means 80), whereas the speed in the transport roller pair 62b and prior components which are upstream of the loop forming area 76 is higher than the above scanning transport speed. The light-sensitive material A transported through the second transport subsection 62 forms a loop in the loop forming area 76 in accordance with its size based on the difference in the upstream/downstream transport speed, as shown by the dotted line in FIG. 4.

In the illustrated case, this configuration enables the separation of the back printing means 54 from the image recording subsection 56 with a short pathlength, whereby a highly precise scanning and transport of the light-sensitive material A is realized.

The light-sensitive material A is supplied from the second transport subsection 62 into the image recording subsection 56. The image recording subsection 56 (which is hereinafter referred to as the "recording subsection") comprises an exposing unit 78 and scan transport means 80. The light beams L modulated in accordance with the image to be recorded, that is, the image data supplied from the processor 14 and deflected in the main scanning direction are emitted from the exposing unit 78 to be incident on the light-sensitive material A in a specified exposing position X, while at the same time the light-sensitive material A held in the exposing position x being transported by the scan transport means 80 in the auxiliary scanning direction perpendicular to the main scanning direction. Thus, the light-sensitive material A is exposed by two-dimensional scanning with the light beams L, thereby forming a latent image thereon.

Figure 5:
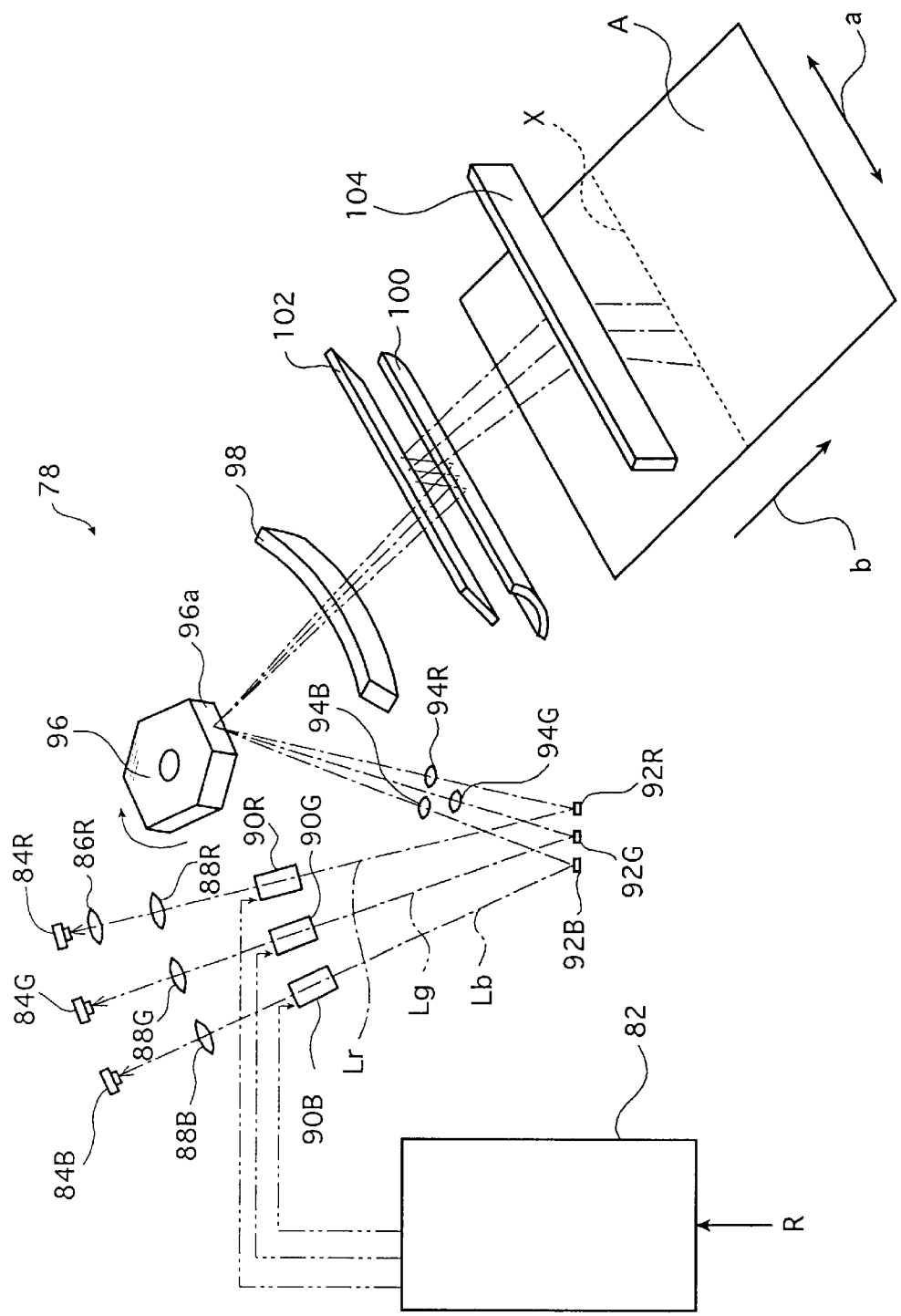
FIG. 5 is a schematic perspective view showing the structure of an exposing unit of the exposing section shown in FIG. 4.

FIG. 5 is a schematic perspective view of the exposing unit 78. The exposing unit 78 is tri-laser light different-angle incidence optics (i.e., three light-source uncombined optics) which performs scan exposure on the light-sensitive material A using light beams of three primary colors; it comprises a recording control subsection 82, laser light sources 84 (84R, 84G and 84B), as well as a collimator lens 86R, condenser lenses 88 (88R, 88G, 88B), AOMs (acoustic optical modulators) 90 (90R, 90G and 90B), reflex mirrors 92 (92R, 92G, 92B), cylindrical lenses 94 (94R, 94G, 94B), a polygonal mirror 96, an fθ lens 98, a cylindrical mirror 100 and reflex mirrors 102 and 104 which are arranged in the direction of travel of light beams L (Lr, Lg and Lb) issued from the respective light sources 84.

The illustrated three light-source uncombined optics uses three laser light sources that emit light beams of specified wavelengths corresponding to the exposure of the light-sensitive material A to red (R), green (G) and blue (B) light; the light beams L issuing from the respective laser light sources are allowed to be incident at a single point on a reflecting surface 96a of the polygonal mirror 96 at slightly different angles (for example, about, four degrees) and deflected in a main scanning direction to be focused at different angles on the same main scanning line on the light-sensitive material A, thereby scanning on the same main scanning line at specified time intervals. It should be noted that combined optics in which a dichroic mirror or the like is used to combine the modulated light beams into a light beam can be also used in the present invention.

In a typical case, the laser light source 84R is a semiconductor laser (LD) issuing a light beam Lr for R exposure at a wavelength of 662 nm; the laser light source 84G is a wavelength converted laser using a SHG device that issues a light beam Lg for G exposure at a wavelength of 532 nm; the laser light source 84B is also a wavelength converted laser using a SHG device but which issues a light beam Lb for B exposure at a wavelength of 473 nm.

The collimator lens 86R is intended for shaping the respective light beams Lr emitted from the laser light source 84R into parallel light beams, whereas the condenser lenses 88 are intended for concentrating the corresponding light beams L on the AOMs 90.

The AOMs 90 are devices by which the respective light beams L are modulated in accordance with the image data (image to be recorded). The method of modulating the light beams is not limited in any particular way, and pulse amplitude modulation or pulse-(width or number) modulation may be used. Alternatively, various modulators including an EOM (electrooptical modulator) can be used instead of the AOM. In addition, when the light source of the light beams is capable of recording by direct modulation, the light source may be modulated.

The AOMs 90 are driven by the recording control subsection 82.

After outputting from the data converting section 40 of the processor 14, the image data for print production with the printer 16 is delivered into the recording control subsection 82, where the delivered image data is subjected to specified processing steps including calibration processing with a correction table. The respective AOMs 90 are driven in accordance with the obtained image data, thereby modulating the light beams L. The light beams L modulated by the AOMs 90 are then incident on the reflex mirrors 92 which function to allow the light beams L to be incident at the same point on the reflecting surface 96a of the polygonal mirror 96 used as a light deflector. The light beams L are deflected by the polygonal mirror 96 in the main scanning direction (shown by arrow "a" in FIG. 5).

The cylindrical lenses 94, the fθ lens 98 and the cylindrical mirror 100 constitute tilt correcting optics to correct the face tilting of the polygonal mirror 96. The fθ lens 98 is used to focus the respective light beams L correctly in any position on the main scanning line.

The cylindrical mirror 100 constitutes a component of the tilt correcting optics. The respective light beams L are refracted to be incident on the reflex mirror 102, which refracts again the light beams L to be incident on the reflex mirror 104. The light beams L reflected by the reflex mirror 104 are incident on the exposing position X (scanning line) of the light-sensitive material A being transported by the scan transport means 80 in the auxiliary scanning direction.

On the other hand, the scan transport means 80 comprises transport roller pairs 80a and 80b which are provided on the opposite sides of the exposing position X, and an exposure guide (not shown) to hold the light-sensitive material A more suitably in the exposing position X. The light-sensitive material A is transported by the transport roller pairs 80a and 80b in the auxiliary scanning direction (shown by arrow "b" in FIG. 5) perpendicular to the main scanning direction, while being held in the exposing position X by means of the exposure guide.

The light beams L are deflected in the main scanning direction, as described above. Hence, the light-sensitive material A is exposed by two-dimensional scanning with the light beams modulated in accordance with the image to be recorded, thereby recording a latent image.

The light-sensitive material A having a latent image recorded thereon by passage through the image recording subsection 56 is subsequently transported to the distributing subsection 58 located downstream of the image recording subsection 56. According to a sequence appropriately determined by the size of the light-sensitive material A and other factors, the distributing subsection 58 distributes individual exposed sheets of the light-sensitive material A in a lateral direction which is perpendicular to the direction of their transport so as to form a plurality of rows that overlap in the transport direction; the sheets are then transported to a transport roller pair 106, through which the light-sensitive material A is supplied to the developing section 44. As a result, the throughput of the developing section 44 can be improved, almost doubled in two rows and tripled in three rows.

The illustrated distributing subsection 58 comprises a belt conveyor 108 to set and transport the light-sensitive material A and a distributing device 110 positioned thereon. The distributing device 110 has two sucker units 112 which are located in a direction perpendicular to the transport direction of the light-sensitive material A with the belt conveyor 108 and which are used to lift and transport the light-sensitive material A obliquely downstream. One of them sets aside the material to right and the other to left. The light-sensitive material A is distributed in the lateral direction to form a plurality of rows.

The sheets of the light-sensitive material A transported by the distributing subsection 58 are supplied by the downstream transport roller pair 106 into the developing section 44, which comprises a color developing bath 114, a bleach-fixing bath 116, and rinsing baths 118a, 118b, 118c and 118d. The sheets of the light-sensitive material A each having a latent image recorded thereon are successively immersed in the respective baths and transported, during which the sheets are subjected to specified wet development steps. The sheets of the light-sensitive material A developed in the developing section 44 are dried in the drying section 46 with warm air to produce prints, which are sorted by a sorter 120 of the delivering section 48 in a specified unit, for example, for each film roll.

The digital photoprinter 10 as described above has two image output devices including the printer 16 and the display 20. However, this is not the sole case of the invention, and the digital photoprinter 10 may have a plurality of printers or displays different in output properties, or at least one printer and at least one display, as far as two or more image output devices different in output properties are provided.

While the image reproducing apparatus of the present invention has been described above in detail, it should be noted that the invention is by no means limited to the examples described above and various improvements and modifications can of course be made without departing from the scope and spirit of the invention.

As described above in detail, the image reproducing apparatus of the invention in which image data supplied from an image data supply source is subjected to specified image processing steps to output with a printer as a hard copy and represent on a display as a visible image, that is, to output the image to be reproduced to a plurality of image output devices and which can significantly reduce the distinction between the image to be represented on the display and the image to be reproduced on the hard copy, or the distinction found on the images reproduced in the image output devices due to the output properties thereof, with reduced cost of the image processing device.

What is claimed is:

1. An image reproducing apparatus to reproduce input image data supplied from an image data supply source as a visible image, comprising:

a display to represent an image;

a printer to output a hard copy having the image recorded thereon; and a single image processing device which shares hardware for processing the input image data to obtain image data to be represented on said display and image data for image recording with said printer and which includes:

an image processing section to subject the input image data supplied from said image data supply source to specified image processing steps to produce processed image data, and a data converting section to convert the processed image data output from said image processing section to the image data to be represented on said display and the image data for image recording with said printer, the data converting section having a first conversion parameter corresponding to conversion of the processed image data to be represented on said display and a second conversion parameter corresponding to conversion of the processed image data to be recorded with said printer, wherein said single image processing device receives input image data and generates the image data to be represented on said display and the image data for image recording with said printer.

2. The image reproducing apparatus according to claim 1, wherein said image processing device subjects the input image data supplied from said image data supply source to the same image processing except that different conversion parameters of the processed image data are used in said data converting section in representing the image on said display and in outputting the hard copy with said printer.

3. The image reproducing apparatus according to claim 2, wherein said conversion parameters are elements of a 3D-LUT or a 3D-MTX to convert said processed image data.

4. The image reproducing apparatus according to claim 1, wherein the image data to be represented on said display and the image data for image recording with said printer have different resolutions between the image to be represented on said display and the image to be reproduced on said hard copy, and wherein said data converting section performs at least one conversion processing of thinning-out, electronic magnification and interpolation to convert said processed image data to obtain the resolutions suitable for each of the image data to be represented on said display and the image data for image recording with said printer.

5. The image reproducing apparatus according to claim 4, wherein said conversion parameters are elements of a 3D-LUT or a 3D-MTX to perform said conversion processing.

6. The image reproducing apparatus according to claim 1, wherein said specified image processing steps to be performed by said image processing section include at least one of color balance adjustment, gradation adjustment, density adjustment, dodging, saturation correction, sharpening, electronic magnification, soft focusing, sepia finishing, black-and-white finishing, high-contrast finishing, low-contrast finishing, posterized finishing, picture-like finishing, extraction of a principal portion (or subject) and red eye treatment.

7. An image reproducing apparatus to reproduce input image data supplied from an image data supply source as a visible image, comprising:

a plurality of output devices to output an image, said plurality of output devices including at least one output device capable of representing the visible image data in a media different than a second output device of the plurality of output devices; and a single image processing device which shares hardware for processing processed image data to obtain image data suitable for output properties of each of said plurality of output devices and which includes:

an image processing section to subject the input image data supplied from said image data supply source to specified image processing steps to produce the processed image data, and a data converting section to convert the processed image data output from said image processing section to the image data suitable for the output properties of each of said plurality of output devices, the data converting section having a plurality of conversion parameters including a first conversion parameter and a second conversion parameter different from the first conversion parameter, wherein the first conversion parameter corresponds to the at least one output device and the second conversion parameter corresponds to the second output device, and wherein said single image processing device receives input image data and generates the image data to be represented on each of said plurality of output devices.

* * * * *